(12) United States Patent
Straeter

(10) Patent No.: US 9,253,946 B2
(45) Date of Patent: Feb. 9, 2016

(54) BALE ACCUMULATOR SYSTEM

(76) Inventor: James E. Straeter, Rochester, IN (US)

( * ) Notice: Subject to any disclaimer, the term of this patent is extended or adjusted under 35 U.S.C. 154(b) by 314 days.

(21) Appl. No.: 13/253,612

(22) Filed: Oct. 5, 2011

(65) Prior Publication Data

US 2013/0089394 A1   Apr. 11, 2013

(51) Int. Cl.
*A01D 90/08* (2006.01)
*A01D 85/00* (2006.01)

(52) U.S. Cl.
CPC ........ *A01D 85/005* (2013.01); *A01D 2085/007* (2013.01); *A01D 2085/008* (2013.01)

(58) Field of Classification Search
CPC .............................. A01D 85/005; A01D 87/12
USPC ......... 414/111, 469, 470, 507, 809, 757, 758, 414/759, 760, 764, 501, 24.5, 24.6; 56/474, 56/475, 477; 198/401, 416, 347.4, 890, 198/890.1, 413
See application file for complete search history.

(56) References Cited

U.S. PATENT DOCUMENTS

| | | | | |
|---|---|---|---|---|
| 2,527,024 A * | 10/1950 | Mitchell | .................... | 198/403 |
| 3,319,804 A * | 5/1967 | Beatty et al. | .................. | 414/759 |
| 3,330,426 A * | 7/1967 | Bishop | .................... | 414/789.7 |
| 3,487,955 A * | 1/1970 | Brown | .................... | 414/789.2 |
| 3,612,309 A * | 10/1971 | Van Doorn et al. | .......... | 414/567 |
| 3,727,744 A * | 4/1973 | Willard | .................... | 198/403 |
| 3,853,229 A * | 12/1974 | Dougherty et al. | .......... | 414/111 |
| 4,190,392 A * | 2/1980 | Butler | .................... | 414/789.3 |
| 4,215,964 A * | 8/1980 | Schrag et al. | .................. | 414/111 |
| 4,310,275 A | 1/1982 | Hoelscher | | |
| 4,604,018 A * | 8/1986 | Kruse | .................... | 414/789.7 |
| 4,710,086 A | 12/1987 | Naaktgeboren et al. | | |
| 4,710,087 A | 12/1987 | Naaktgeboren et al. | | |
| 4,955,774 A | 9/1990 | Van Eecke et al. | | |
| 4,961,679 A | 10/1990 | Van Eecke et al. | | |
| 5,006,037 A * | 4/1991 | Bluemle | .................... | 414/771 |
| 5,542,803 A * | 8/1996 | Driggs | .................... | 414/111 |
| 6,019,562 A * | 2/2000 | Cheatham | .................... | 414/111 |
| 6,152,536 A * | 11/2000 | Krinhop | .................... | 298/18 |
| 6,446,785 B1 * | 9/2002 | Tremblay | .................... | 198/404 |
| 6,537,008 B1 * | 3/2003 | Haring | .................... | 414/24.5 |
| 6,557,692 B2 * | 5/2003 | Runonen | .................... | 198/403 |
| 6,935,827 B2 * | 8/2005 | Delaurier | .................... | 414/24.5 |
| 7,252,190 B2 | 8/2007 | Priepke | | |

(Continued)

FOREIGN PATENT DOCUMENTS

EP   1372372   1/2004
EP   2241174   10/2010

(Continued)

OTHER PUBLICATIONS

Photocopies of Pictures Taken by Inventor James E. Straeter of a Self-Made Unit of a One-Off Bale Wagon, photographed in Topeka, Indiana and sent to us in Aug. 24, 2011 e-mail.

*Primary Examiner* — Saul Rodriguez
*Assistant Examiner* — Lynn Schwenning
(74) *Attorney, Agent, or Firm* — Zarley Law Firm, P.L.C.

(57) ABSTRACT

A bale accumulator system that includes a bale accumulator that has a platform with a plurality of centrally located rollers that extend from a first end of the platform to a second end of the platform. First and second pivot racks are provided that have L-shaped support members that are used so that once the plurality of rollers are full of bales the first or second pivot racks can be pivoted in order to place the bales at a different storage location on the platform.

20 Claims, 6 Drawing Sheets

(56) References Cited

U.S. PATENT DOCUMENTS

| | | | |
|---|---|---|---|
| 7,371,040 B2 * | 5/2008 | Jacobs | 414/789.7 |
| 7,481,612 B2 | 1/2009 | Priepke | |
| 7,621,709 B2 | 11/2009 | Heitz, Jr. | |
| 2002/0018702 A1 * | 2/2002 | Stredwick et al. | 414/111 |
| 2002/0184870 A1 * | 12/2002 | Spaniol et al. | 56/474 |
| 2002/0187021 A1 * | 12/2002 | Drost | 414/111 |
| 2008/0095597 A1 | 4/2008 | Heitz, Jr. | |

FOREIGN PATENT DOCUMENTS

| | | |
|---|---|---|
| GB | 1429486 | 3/1976 |
| WO | 9911111 | 3/1999 |
| WO | 2007126451 | 11/2007 |

* cited by examiner

BALE ACCUMULATOR SYSTEM

BACKGROUND OF THE INVENTION

This invention relates to agricultural products. More specifically, this invention relates to a bale accumulator system.

Currently, in the agricultural arts balers are used to traverse through fields in order to pick up stover, stalks, plant remains and the like in order to form bales. A tractor pulls a baler along that intakes the stover or stalks and presses them into a bale and a slide at the back of the baler deposits the bale within the field once the bale gets to a predetermined size. This system is problematic because it randomly places large and heavy bales of hay periodically throughout a field. These bales must then be moved or hauled to different locations typically causing many man hours to be used in order to remove the bales from the field. In addition, there is no control where a specific bale will end up being placed in the field and bales can be placed in mud or in other unsatisfactory locations making moving the bales even more difficult and potentially causing bales to become wet.

In order to address this issue bale accumulators have been manufactured that trail behind the baler and present a platform on which bales can rest. Then, after a predetermined amount of bales are on the accumulator, the accumulator can be taken to a predetermined location in the field to unload the bales. The problem with accumulators is that once a single row of baled hay is accumulated either the bales must be dumped at that location, which again, can be undesirable or baling must be stopped so that the bales can be unloaded at a predetermined location such as at the edge of a field. Again, while an improvement, problems still remain. Current designs are limited to low bale numbers due to design limits reducing the benefit of accumulation by having many more groups of bales placed about a field.

As a result, some accumulators attempt to present embodiments they increase the size of the platform and provide mechanisms in order to place the bales at additional locations on a wider and bigger platform. These mechanisms typically are very difficult to use, involve many moving parts, are difficult to maintain and don't always function as desired. Thus, a need in the art exists for a more efficient and longer lasting bale accumulator that holds a large number of bales that overcomes the problems in the art.

Thus, a principal object of the present invention is to provide a bale accumulator that efficiently moves bales of hay to additional storage sections on the accumulator.

Yet another object of the present invention is to provide a bale accumulator that is easy to maintain and operate.

These and other objectives, features, and advantages will become apparent from the rest of the specification and claims.

BRIEF SUMMARY OF THE INVENTION

A bale accumulator system that includes a baler accumulator that has a platform extending from a first end to a second end. The accumulator also has a plurality of centrally located rollers. First and second pivot racks each having a rod that is pivotably mounted to the platform with first and second arms extending from the rod are provided. The first arm of each of the first and second pivot racks extends adjacent to the rollers and underneath bales that are loaded onto the rollers. An actuator that is operably connected to each of the first and second pivot arms can actuate either pivot arm in order to rotate the pivot arm from a first position where the first arm is underneath a bale to a second position off of the plurality of rollers and onto another section of the platform such that the second arm is under the bale.

DETAILED DESCRIPTION OF THE PREFERRED EMBODIMENT

Figure 1:
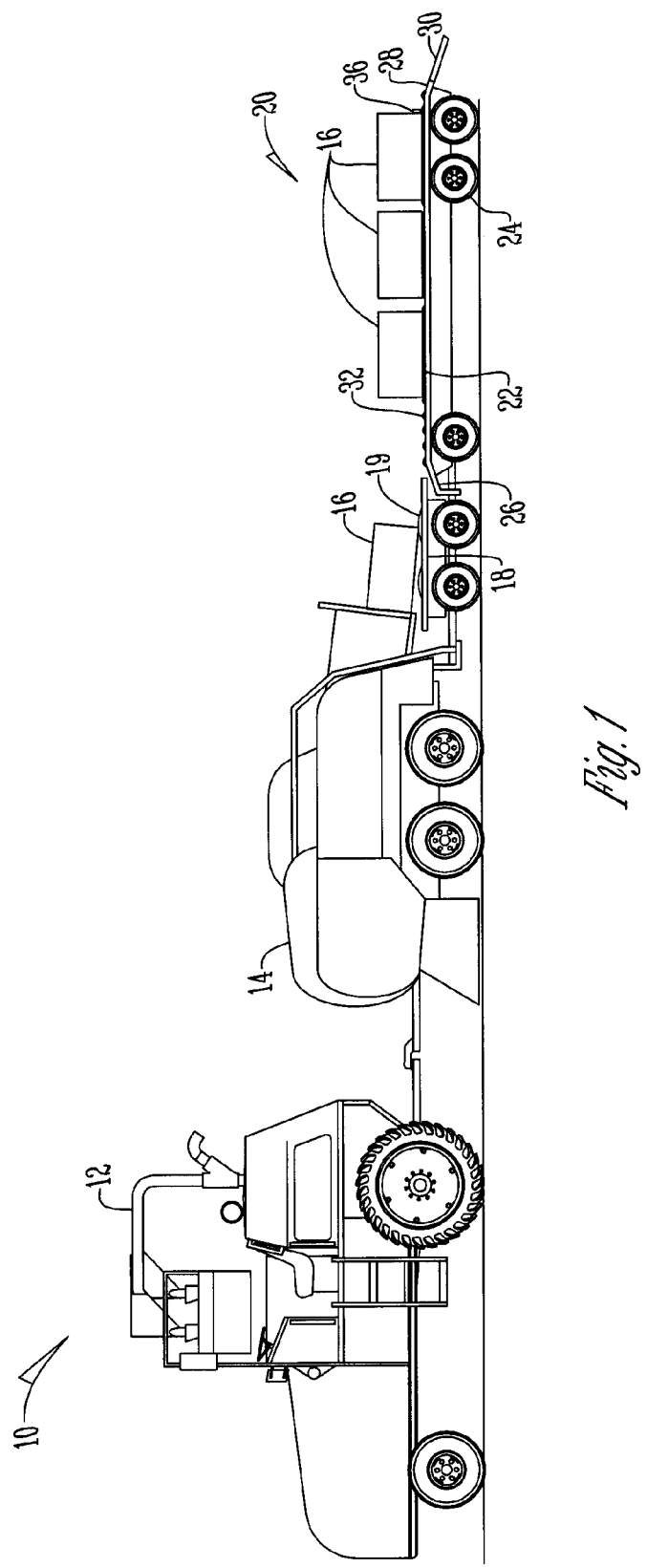
FIG. 1 is a side plan view of a bale accumulator system.

The figures show a bale accumulator system 10 that includes a tractor 12 that pulls a baler 14 in order to create bales 16 that are unloaded from the baler 14 as is known in the art. Bales 16 are presented in the figures with a string 17 around the bale 16 as can be known in the art for illustrative purposes to assist in the understanding of the movement of the bales 16 in the Figures. The bale 16 is unloaded onto a bale moving device 18 or transition table. The bale moving device 18 has a plurality of spiral rollers 19 that rotate to convey a bale 16 received by the baler 14 to a central location on the bale moving device 18 for transportation to a bale accumulator 20. In this manner even when bales 16 are received by the bale moving device 18 when the tractor 12 and/or baler 14 are turning, the bale 16 is centered when conveyed to the baler accumulator 20.

The baler accumulator 20 is attached to the bale moving device 18 or alternatively the baler 14 such the tractor 12 pulls the bale accumulator 20. The bale accumulator 20 has a platform 22 and is supported by a plurality of wheels 24 that assist the bale accumulator 20 in traversing a field. The platform 22 extends from a first end 26 adjacent the bale moving device 18 or baler 14 to a second end 28 that has an unload slide 30 for unloading the bales 16.

A plurality of rollers or cylinders 32 are centrally located on the platform 22 and extend from the first end 26 to the second 28. The plurality of rollers 32 are disposed within the platform 22 such that the rollers 32 extend above the top surface 34 of the platform 22 such that when a bale 16 is loaded onto the platform 22 the bale 16 is loaded directly onto the rollers 32. The plurality of rollers 32 rotate so that bales 16 move from the first end 26 of the platform 22 to the second end 28 of the platform 22 across the rollers 32. The bales 16 stops on the platform 22 where the plurality of rollers 32 end adjacent the unload slide 30. If needed, a stop 36 can optionally be used that is movable to stop the bales 16 from traversing off the plurality of rollers 32 when uneven terrain or other conditions warrant.

Additionally, mounted on the platform 22 are first and second pivot racks 38 and 40. Each of the first and second pivot racks 38 and 40 has a rod element 42 rotatably or pivotably mounted to the platform 22 and a plurality of first arms and second arms 44 and 46 extend from each rod element 42. Specifically, the first arms 44 in a first position extend transversely, adjacent, parallel and in between the plurality of rollers 32 and extend across the length of the rollers 32. Specifically, the first arms 44 are positioned below the top of the plurality of rollers 32 and even with or beneath the platform top surface 34 such that when a bale 16 is on the plurality of rollers 32 the first arms 44 are beneath the bale 16 and do not engage the bale 16. Meanwhile, the plurality of second arms 46 extend upwardly adjacent a bale 16 and in a preferred embodiment are perpendicular to the first arms 44. In this manner, each of the first arms 44 and corresponding second arms 46 form a plurality of L-shaped support members 48 that are pivotable about the rod element 42.

An actuator 50 is operably connected to each of the first and second pivot racks 38 and 40 and electrically connected to a controller 52. Specifically, the actuator 50 pivots or rotates the rod element 42 to move the plurality of first and second arms 44 and 46 from a first position as described above, to a second position where the plurality of first arms 44 extends upward from the rod element 42 from the platform 22 while the plurality of second arms 46 extends transversely parallel to the plurality of rollers 32. Meanwhile the controller 52 can be actuated by the operator of the tractor 12 in order to pivot the first and/or second pivot racks 38 and 40 at any required time. Alternatively, sensors 54 can be placed about the plurality of rollers 32 to detect when the plurality of rollers 32 are full of bales 16 to automatically actuate the first and second pivot racks 38 and 40. The sensors 54 can also control the roller rotation to properly control bale location while loading is occurring. In this manner the sensors 54 can also indicate when each of the pivot racks 38 and 40 are in a second position and the plurality of cylinders 32 are full of bales 16 indicating that the platform 22 is full.

The system can be expanded by adding additional pivot racks such that bales 16A for example, can be rotated off of pivot rack 38 and the pivot rack 38 can return to its original position for reloading. See FIGS. 6A and 6B.

Figure 2:
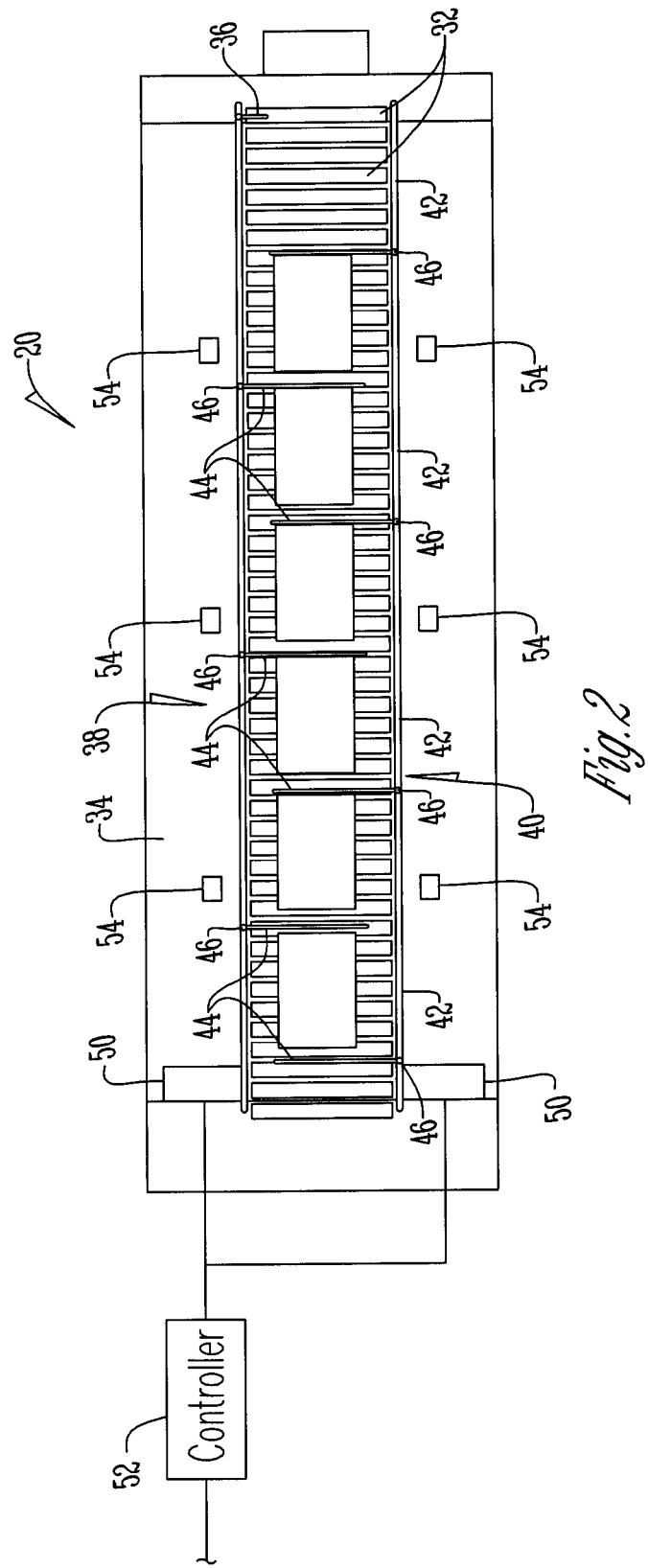
FIG. 2 is a top plan view of a bale accumulator.
Figure 3:
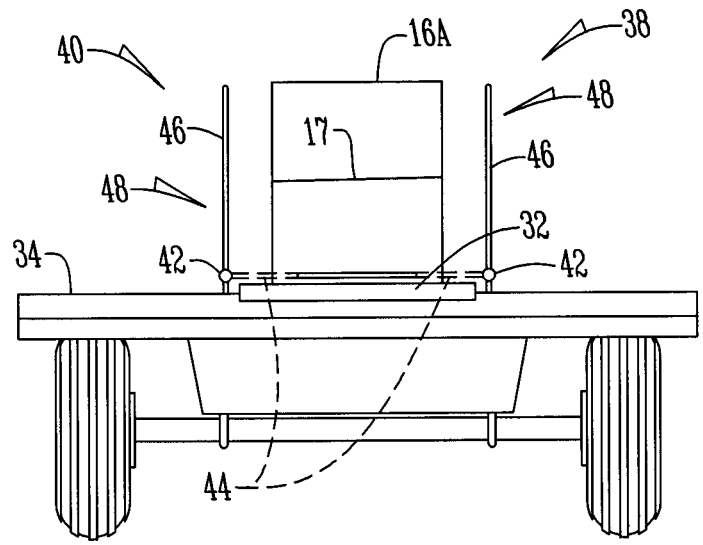
FIG. 3 is a side front view of a bale accumulator with first and second pivot racks in a first position.

In operation, as is shown in FIG. 2 as the tractor 12 traverses through the field and the baler 14 makes bales 16 a first set of bales 16A are loaded onto the plurality of rollers 32 until the plurality of rollers 32 are full. The bales 16A move across the rollers 32 by tilting the platform to cause the bales 16A to move across the rollers, by the bales engaging and pushing one another as they are unloaded onto the rollers 32 from the baler 14 or moving device 18, or by automatic rotation of the rollers by the controller 52.

At this time either manually or automatically, the first pivot rack 38 is pivoted by the actuator 50 from its first position to its second position. During this action the plurality of first arms 44 engage the bottom of the bales 16A and move the bales 16A off the rollers 32 about the rod axis such that the bales 16A come to rest on the second arms 46 of the first pivot rack 38 while the first arms 44 of the first pivot rack 38 are positioned adjacent the bales 16A and perpendicular to the plurality of rollers 32 as best shown in FIG. 4.

Figure 4:
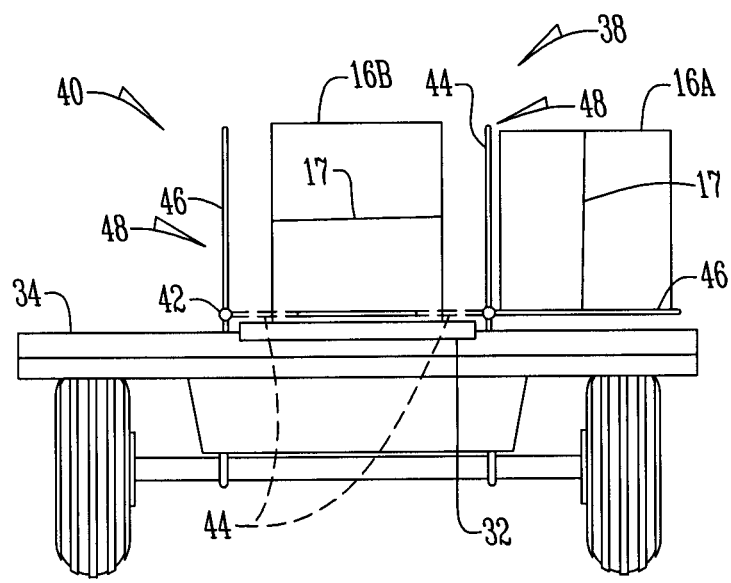
FIG. 4 is a side front plan view of a bale accumulator with a first pivot rack in a second position and a second pivot rack in a first position.

As also shown in FIG. 4 at this time additional bales 16B are loaded onto the plurality of cylinders 32 until once again the plurality of rollers 32 are full. At this time the actuator 50 pivots the second pivot rack 40 about the axis of the rod element 42 in order to move the plurality of bales 16B off of the plurality of rollers 32 to an outside section of the platform 22 by moving the second pivot rack 40 from its first position to its second position. At this time the bales 16B engage or rest on the second arms 46 of the second pivot rack 40 while the first arms 44 of the second pivot rack 40 extend upwardly and perpendicular to the plurality of rollers 32 as best shown in FIG. 5.

Figure 5:
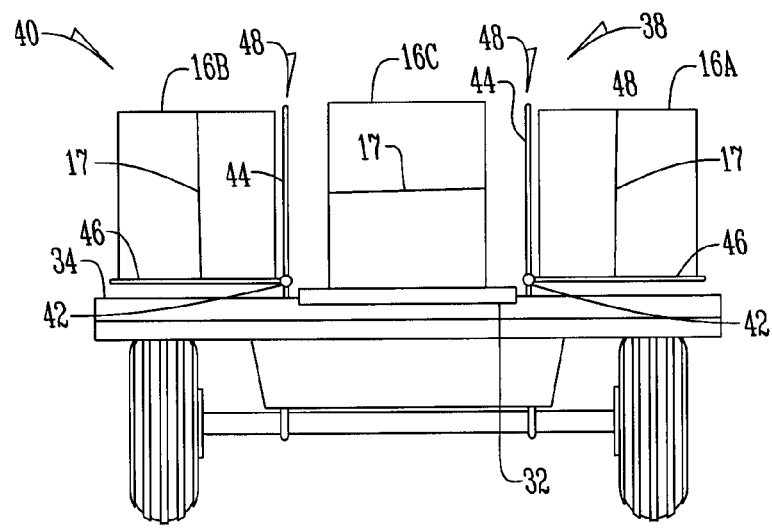
FIG. 5 is a side plan front view of a bale accumulator with first and second pivot racks in a second position.

As also shown in FIG. 5 once both the first pivot rack and second pivot rack 38 and 40 are in a second position a third set of a plurality of bales 16C are then loaded onto the plurality of rollers 32 providing three rows of bales 16A, 16B and 16C that can be accumulated on the platform 22 before unloading is required. During the unloading process the bales 16C that are on the plurality of rollers 32 are first removed from the platform 22 by sliding them off of the unload slide 30.

Figure 6A:
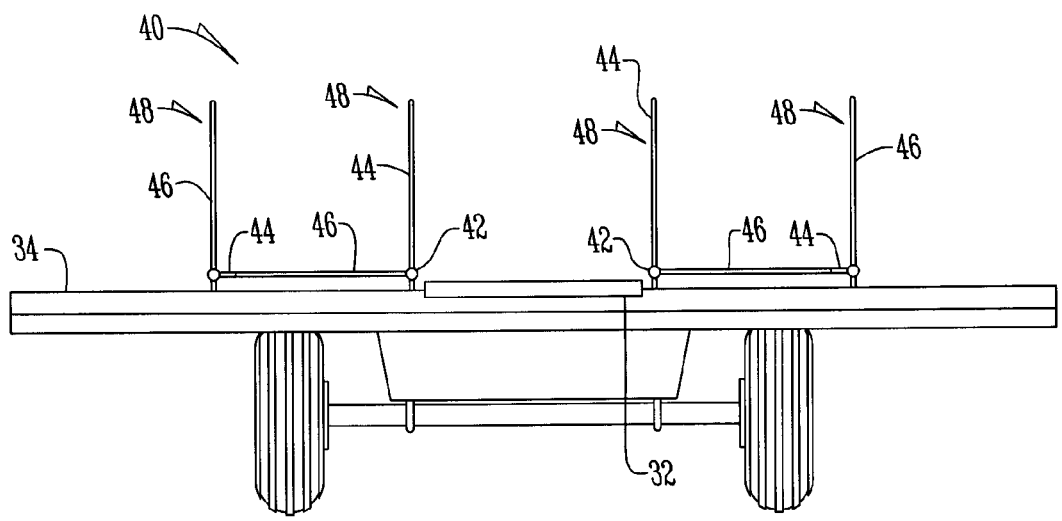
FIG. 6A is a front plan view of a bale accumulator.
Figure 6B:
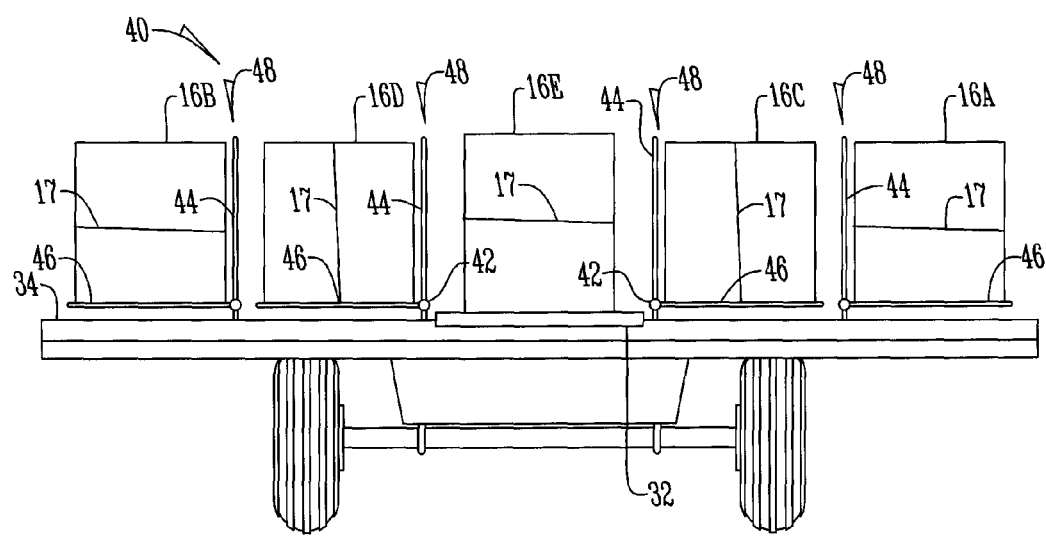
FIG. 6B is a front plan view of a loaded bale accumulator.
Figure 7:
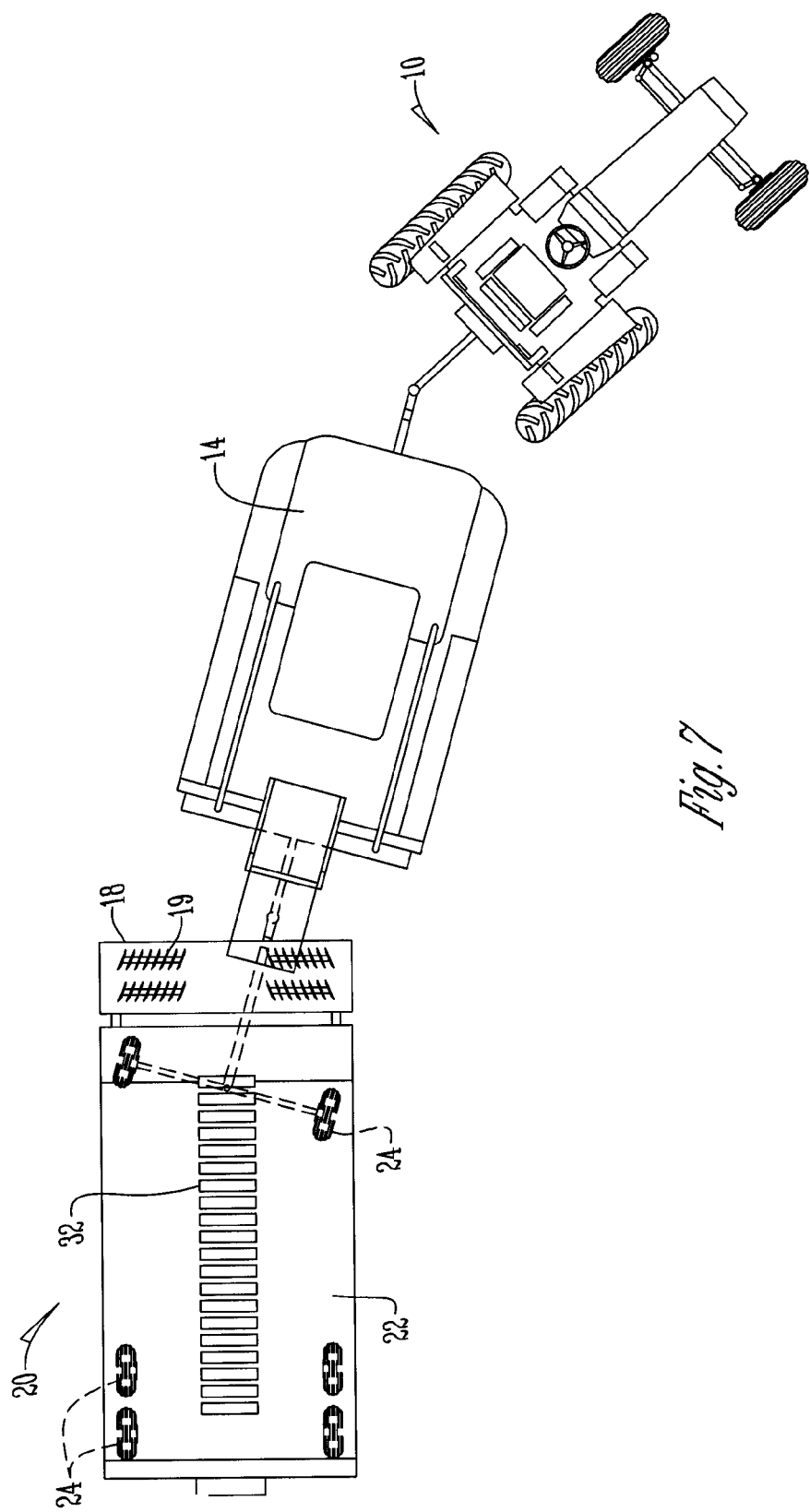
FIG. 7 is a top plan view of a bale accumulator.

Once the bales 16C are removed, the second pivot rack 40 is actuated by the actuator 50 to move from its second position to its first position in order to place the plurality of bales 16B that were being stored on the platform 22 back onto the plurality of rollers 32 to be unloaded onto the unload slide 30. Once the second group of the bales 16B are unloaded the actuator 50 can rotate the first pivot rack 38 from its second position to its first position again to move the bales 16A being stored on the platform 22 back onto the plurality of rollers 32. At this time the bales 16A can similarly be unloaded onto the unload slide 30 such that three groups of bales are unloaded. As shown in FIGS. 5, 6A and 6B this procedure can be duplicated to accommodate five rows of bales 16A-16E or more without falling outside the scope of this disclosure.

Thus, provided is a bale accumulator system 10 that allows for an increased amount of bales to be placed onto a bale accumulator 20. By utilizing a plurality of simple L-shaped support members 48 that are easily rotated, a plurality of bales can be efficiently and quickly moved from the plurality of rollers 32 to storage locations on the platform 22. The first and second pivot racks 38 and 40 can easily be moved from their second position to their first position in order to unload the plurality of bales 16 in order to provide a quick and efficient manner of loading and unloading bales to and from the bale accumulator 20. In addition, complex moving systems are eliminated and not needed thus reducing cost associated with the bale accumulator 20 and repair. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A bale accumulator system comprising:
 a bale moving device having a plurality of spiral rollers;
 a bale accumulator connected to the bale moving device wherein the bale accumulator has a platform extending from a first end to a second end and having a plurality of rollers;
 a first rack and second rack having rods pivotally mounted to the platform on the sides of the plurality of rollers with a first arm and a second arm extending from the rods;
 the first arm extending adjacent a roller of the plurality of rollers underneath a bale in a first position;
 an actuator operably connected to the first and second pivot racks to pivot the first and second pivot racks from the first position to a second position to move the bales off of the plurality of rollers to an outside section of the platform; and
 wherein the second arm of the first and second pivot rack is underneath the bale in the second position.

2. The bale accumulator system of claim 1 wherein the actuator pivots the first and second racks independently.

3. The bale accumulator system of claim 1 wherein the bale accumulator receives the bale at the first end of the platform from a baler.

4. The bale accumulator system of claim 1 wherein the bale is unloaded from the plurality of rollers onto an unload slide.

5. The bale accumulator system of claim 1 wherein when the first and second racks are in the second position the bales are positioned adjacent to the plurality of rollers.

6. The bale accumulator system of claim 1 further a plurality of sensors placed about the plurality of rollers to detect when the plurality of rollers are full of bales.

7. The bale accumulator system of claim 6 wherein when the sensors detect the rollers are full of bales the actuator automatically actuates the first and second racks.

8. The bale accumulator system of claim 6 wherein the sensors control the roller rotation.

9. The bale accumulator system of claim 1 further comprising additional racks to rotate off bales of the first and second racks.

10. The bale accumulator system of claim 1 wherein the plurality of rollers are disposed within the platform such that the plurality of rollers extend above a top surface of the platform.

11. A bale accumulator system comprising:
 a bale accumulator having a platform extending from a first end to a second end;
 a plurality of rollers located on the platform;
 a plurality of sensors placed about the plurality of rollers to detect when the plurality of rollers are full of bales;
 a first rack pivotably mounted on a first side of the plurality of rollers with a first rod having a plurality of L-shaped support members having a first arm and a second arm;
 a second rack pivotably mounted on a second side of the plurality of rollers with a second rod having a plurality of L-shaped support members having a first arm and a second arm; and
 an actuator operably connected to the first and second racks to rotate from a first position to a second position.

12. The bale accumulator system of claim 11 wherein when the first and second racks are in the first position the first arm extends transversely, adjacent, parallel and between the plurality of rollers and the second arm extends upwardly.

13. The bale accumulator system of claim 11 wherein when the first and second racks are in the second position the second arm extends transversely adjacent the plurality of rollers and the first arm extends upwardly.

14. The bale accumulator system of claim 11 wherein the first and second racks are independently actuated.

15. The bale accumulator system of claim 14 wherein the first rack is rotated by the actuator from its first position to its second position to rotate off a first set of bales.

16. The bale accumulator system of claim 14 wherein the second rack is rotated by the actuator from its first position to its second position to rotate off a second set of bales.

17. The bale accumulator system of claim 11 wherein when the sensors detect the rollers are full of bales the actuator automatically actuates the first and second racks.

18. The bale accumulator system of claim 11 wherein the sensors control the roller rotation.

19. The bale accumulator system of claim 11 further comprising additional pivot racks to rotate off bales of the first and second racks wherein when the first and second racks are in the second position.

20. The bale accumulator system of claim 11 wherein the plurality of rollers are disposed within the platform such that the plurality of rollers extend above a top surface of the platform.

* * * * *